United States Patent

[11] 3,604,996

| | | |
|---|---|---|
| [72] | Inventor | Fritz Norman Lutz<br>Northfield, Ohio |
| [21] | Appl. No. | 762,858 |
| [22] | Filed | Sept. 26, 1968 |
| [45] | Patented | Sept. 14, 1971 |
| [73] | Assignee | The Warner & Swasey Company<br>Cleveland, Ohio |

[54] CONTROLLED POWER SUPPLY SYSTEM
27 Claims, 3 Drawing Figs.

[52] U.S. Cl. ................................................ 318/345,
318/331
[51] Int. Cl. ............................................. H02p 5/16
[50] Field of Search ............................ 318/317,
327, 331, 341, 345, 20.290

[56] References Cited
UNITED STATES PATENTS

| | | | |
|---|---|---|---|
| 3,393,354 | 7/1968 | Gaither | 318/341 |
| 3,260,912 | 7/1966 | Gregory | 318/20.290 |
| 3,368,128 | 2/1968 | Parrish | 318/331 |
| 3,422,332 | 1/1969 | Dinger | 318/331 |
| 3,436,629 | 4/1969 | Adler | 318/20.290 |

*Primary Examiner*—Oris L. Rader
*Assistant Examiner*—Thomas Langer
*Attorney*—Yount, Flynn & Tarolli ABSTRACT: Controlled power supply system for connection to an AC source and having two oppositely connected silicon controlled rectifiers (SCRs) for conducting current in opposite directions to an electrical load. Two sawtooth waves of opposite slope and phase-displaced by 180° are combined with an error signal to determine the firing times of the SCRs. The error signal represents the difference between a desired value and the actual value of a load variable, such as rotational speed when the load is an electric motor. Each sawtooth wave has a period equal to the AC source signal and during each cycle has a straight line slope for 270°, is abruptly reset to a reference level, and remains at the reference level for the remaining 90° of the cycle.

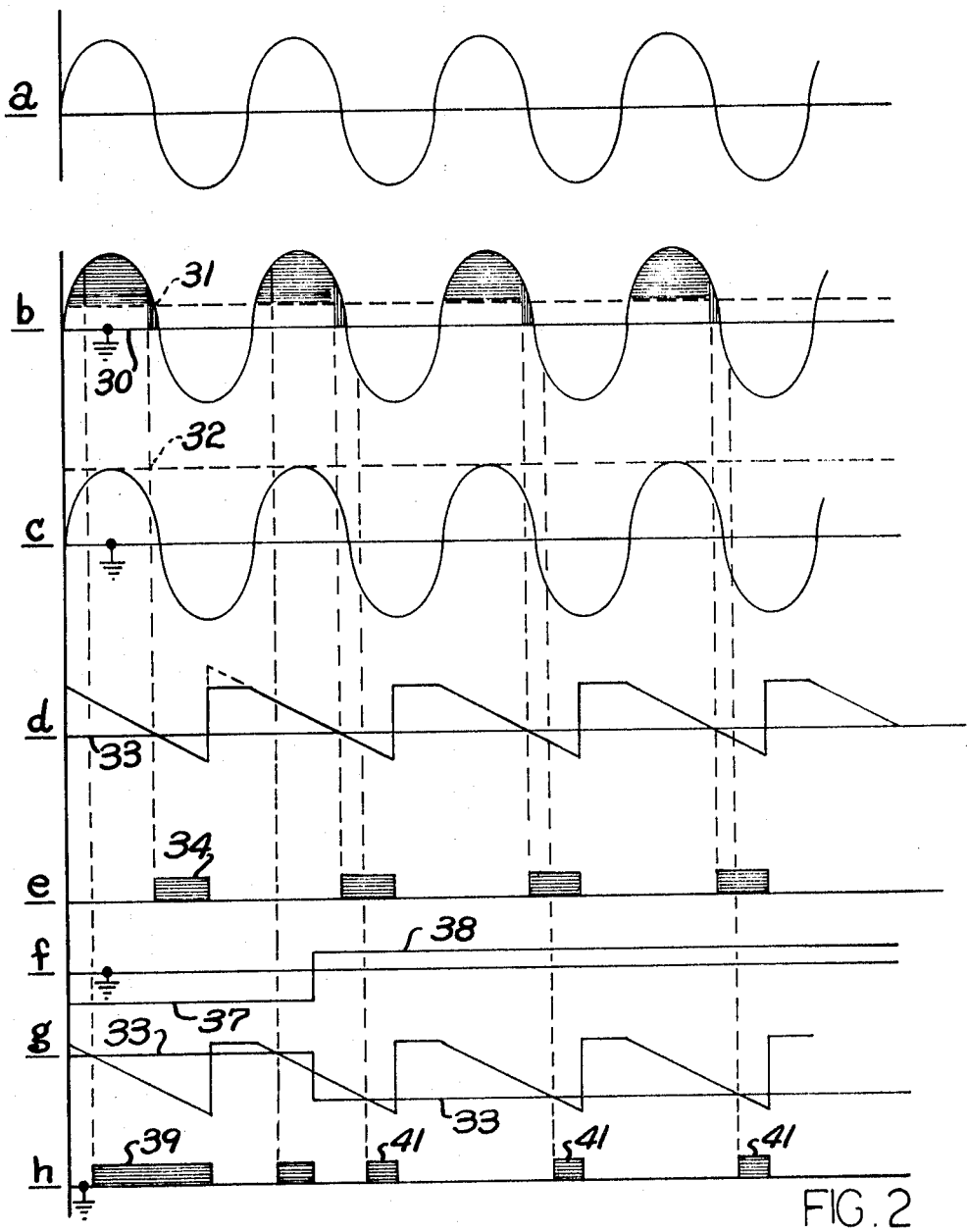
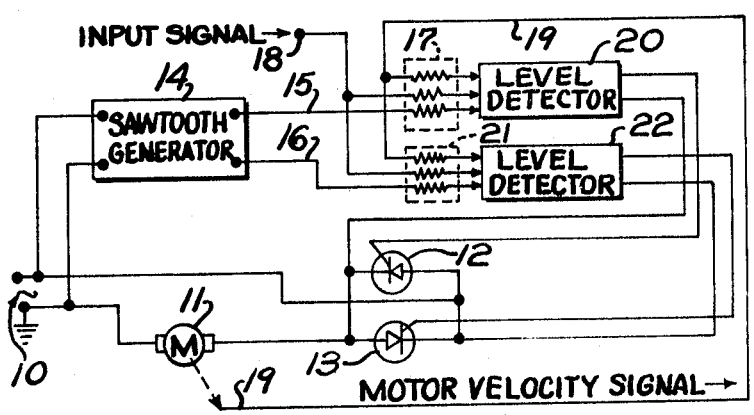
FIG. 2
FIG. 1
INVENTOR.
FRITZ NORMAN LUTZ

CONTROLLED POWER SUPPLY SYSTEM

This invention relates generally to controlled power supplies, and more particularly, to power supplies having feedback control.

Various power supplies have been proposed heretofore that employ a controlled rectifier to control the energization of an electrical load from an AC power source so as to achieve the desired response of some load variable. A major shortcoming of power supplies of this kind has been their inability to precisely control the load variable, especially at very small error signals. The present invention provides a controlled power supply system capable of precise control of a load variable over a wide range, including very small error signals.

It is a principal object of this invention to provide a controlled power supply system having novel provision for varying the energization of a connected load to precisely control a load variable.

It is another object of this invention to provide such a system in which small error signals trigger the SCRs during those periods of an AC source when the amount of current therefrom that can be passed to the load is relatively small and can be precisely controlled.

Another object of this invention is to provide a novel and improved controlled poser supply system having novel provision for controlling the energization, and therefore the response of the load variable, during more than 180° and up to 360° of each cycle of AC power source.

Another object of this invention is to provide a novel and improved controlled power supply system in which a pair of sawtooth waves, phase-displaced by 180° with respect to each other, are combined with an error signal to control load current through a pair of oppositely connected controlled rectifiers, the error signal being proportional to the difference between a desired value and the actual value of a load variable desired to be controlled.

Another object of this invention is to provide a system as just described wherein each of the sawtooth waves has a straight line slope for some portion of a cycle of the AC source voltage, is abruptly reset to a reference level, and remains at the reference level for the remaining portion of the cycle of the AC source voltage.

Further objects and advantages of the present invention will be apparent from the following detailed description of a presently preferred embodiment, with reference to the accompanying drawings in which:

FIG. 1 is a schematic electrical circuit diagram of the present controlled power supply system;

FIG. 2 illustrates the electrical waveforms associated with the flow of positive current to the load.

Figure 3:
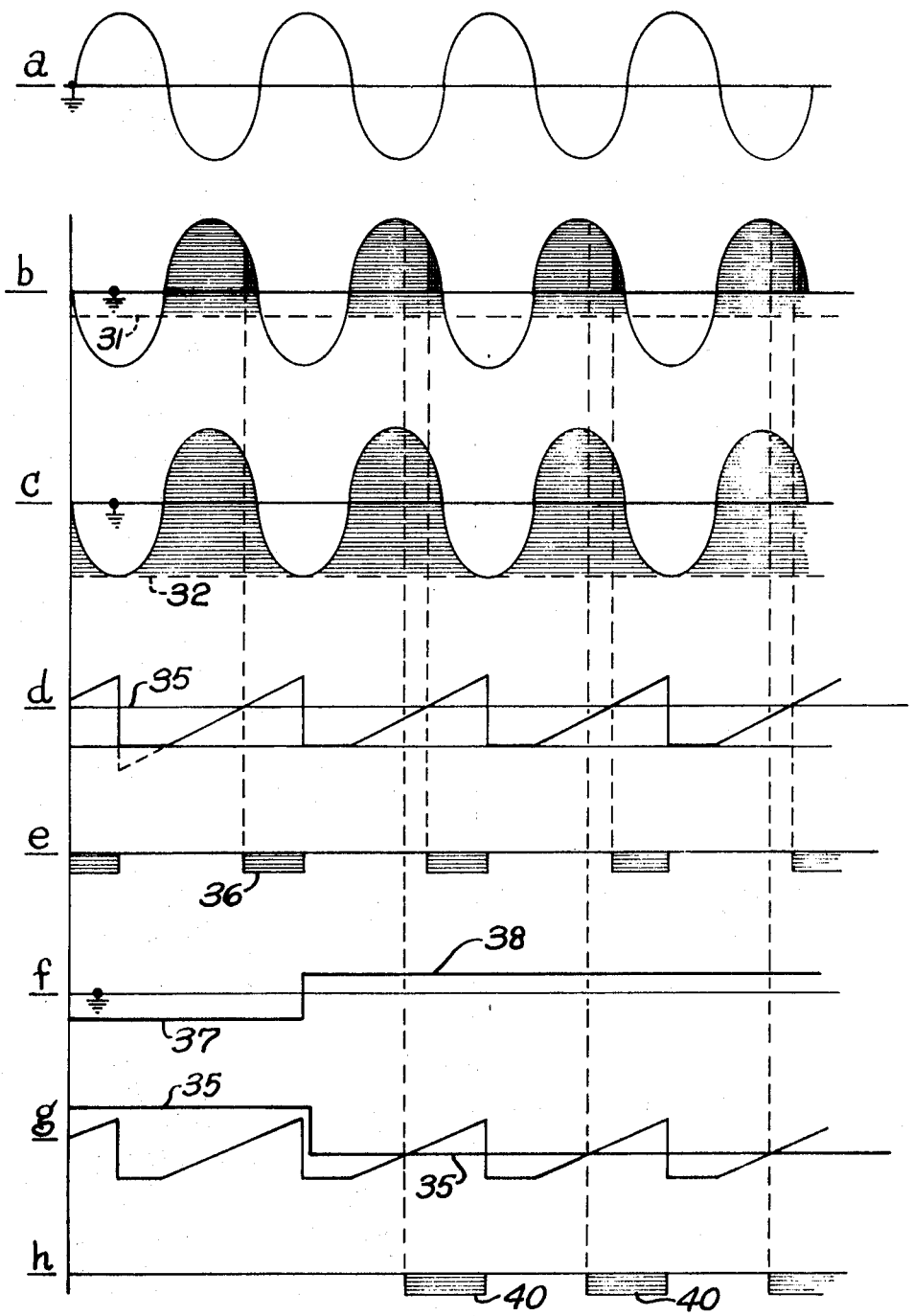
FIG. 3 illustrates corresponding waveforms associated with the flow of negative current to the load.

Although many and varied loads, both AC and DC may be energized by the controlled power supply system of the present invention to control a load variable, the system will be described with a DC motor being connected as the load and with the motor rotational speed being the controlled load variable.

Referring to FIG. 1, the present system comprises an AC source 10 providing a sine wave signal, load in the form of a DC motor 11, and first and second oppositely connected SCRs 12 and 13 for respectively passing positive and negative current between the source 10 and motor 11, as described hereinafter. The system also includes a sawtooth generator 14, which is energized from the AC power source 10. The sawtooth generator produces respective "positive" and "negative" sawtooth waves on its output lines 15 and 16, each having a period equal to the AC source signal. The "positive" sawtooth signal on line 15 is so named because it controls positive motor current flow through the motor via SCR 12. Similarly, the "negative" sawtooth signal on line 16 is so named because it controls the negative, or reverse, motor current flow through the motor via SCR 13. These two sawtooth waves are inverted and phase-displaced 180° with respect to each other, as explained hereinafter.

A first summing network 17 is connected to receive on a line 18 an input control signal proportional to the desired value of the controlled load variable and on a line 19 a feedback signal proportional to the actual value of the controlled load variable. The polarity of the feedback signal is opposite to the polarity of the input signal so that in summing network 17 the feedback signal is effectively subtracted from the input signal to provide an error signal. Summing network 17 also combines with the error signal a level adjust signal (not shown) and the sawtooth signal on line 15.

The output of the summing network 17 is applied to the input of a first level detector 20. When the instantaneous value of the error signal plus the sawtooth signal exceeds the value of the level adjust signal, the input to the level detector 20 changes sign causing the level detector 20 to produce a step output signal which is applied across the gate and cathode electrodes of SCR 12. This output signal from the level detector 20 is effective to turn on SCR 12 for positive current flow from its anode to its cathode if, during the presence of the turn-on signal, the anode is, or becomes, sufficiently positive with respect to the cathode. Once conducting in response to the turn-on signal from the level detector 20, such positive anode-to-cathode current through the SCR 12 will continue to flow until its anode is no longer sufficiently positive with respect to its cathode, even though the turn-on signal may earlier be removed from the gate electrode of SCR 12.

Conversely, so long as the instantaneous value of the error signal plus the sawtooth signal on line 15 is less than the value of the level adjust signal, there will be no turn-on signal from the level detector 20 and SCR 12 will remain nonconducting even though its anode becomes quite positive with respect to its cathode.

A second summing network 21 is connected to receive the input signal on line 18 and feedback signal on line 19 to produce an error signal, and to combine therewith the sawtooth signal on line 16 and a level adjust signal (not shown). The output from summing network 21 is applied to a second level detector 22. When the instantaneous value of the error signal plus the sawtooth signal exceeds the value of the level adjust signal, the input to level detector 22 changes sign causing level detector 22 to produce a step output signal which is applied to the gate electrode of SCR 13. This output signal from the level detector 22 is effective to turn on SCR 13 if its anode is sufficiently positive with respect to its cathode, to deliver negative current to the motor 11. Once conducting in response to the turn-on signal from level detector 22, SCR 13 will continue to conduct until its anode is no longer sufficiently positive with respect to its cathode, even though the turn-on signal may earlier be removed from the gate electrode of SCR 13.

So long as the instantaneous value of the error signal plus the sawtooth signal on line 16 is less than the value of the level adjust signal, there will be no turn-on signal from level detector 22 and SCR 13 will remain nonconducting even though its anode becomes quite positive with respect to its cathode.

As shown in FIG. 1, the anode of SCR 12 is connected directly to the cathode of SCR 13 and the cathode of SCR 12 is connected directly to the anode of SCR 13. With this arrangement, only one of the SCRs can conduct anode-to-cathode current at any particular instant. Current through the first SCR 12 flows through the motor 11 as "positive" current tending to cause rotation of the motor in the "forward" direction. Conversely, current through the second SCR 13 flows through the motor 11 as "negative" current tending to cause rotation of the motor in the "reverse" direction.

It will be recognized that in cases where the load variable is capable of being driven in only one direction, only one summing network, one sawtooth wave, one level detector and one SCR would be required to provide half wave control of the variable. This would be the case, for example, if the load were a heating element and the load variable were temperature. Full wave control of such a load could be provided by the circuit of FIG. 1 merely by inverting the sawtooth wave on line 16 and the level adjust signal to summing network 21. If, on the other hand, a load consisting of a heating element and a cooling device were connected, with temperature being the controlled variable, one SCR could be used to drive the heating element and the other SCR to drive the cooling device, thereby providing bidirectional control of the controlled temperature. Many other loads, both unidirectional and bidirectional, may be driven by the controlled power supply of the present invention.

In the embodiment of FIG. 1, rotation of the motor 11 in either direction will cause the motor to develop a back e.m.f., proportional to motor speed. For example, assume that SCR 12 passes positive current to the motor during a positive half-cycle of the source 10, and that this positive current causes the motor 11 to rotate in the forward direction, developing a back e.m.f., that opposes the flow of positive current. Positive current will continue to flow during the positive half-cycle of the source until, as the instantaneous value of source voltage decreases and the back e.m.f., increases, the anode of SCR 12 is no longer sufficiently positive with respect to its cathode, at which time the flow of positive current ceases.

During the remainder of the positive half-cycle, and during the following negative half-cycle of the source voltage, SCR 12 cannot conduct because it is reverse biased. SCR 12 cannot again conduct until some time into the next positive half-cycle of the source voltage when the magnitude of the source voltage rises to a value sufficient to overcome the back e.m.f., and the small voltage necessary to forward bias SCR 12 sufficiently that a turn-on signal applied to its gate electrode will be effective. In other words, SCR 12 cannot begin to conduct during the next positive half-cycle of the source voltage unless both of the following conditions exist simultaneously:

1. its gate electrode receives a turn-on signal making it positive with respect to its cathode; and
2. its anode is sufficiently positive with respect to its cathode.

Thus, it will be seen that the effect of back e.m.f., having a polarity opposed to positive source voltage, is to retard the firing time and to advance the turnoff time of SCR 12.

Now assume that the motor 11 is rotating in the reverse direction, either as a result of SCR 13 having been fired or by being rotated by an external force, and that it is desired either to stop the motor or to drive it in the forward direction of rotation. This is, of course, effected by firing SCR 12 to conduct positive current to the motor to create a torque tending to drive the motor in the forward direction. With the motor rotating in the reverse direction, the developed back e.m.f., will be aiding rather than opposing the source voltage. The resulting effect is to advance the time when SCR 12 can be fired to a time within the negative half-cycle preceding the positive half-cycle of the source under consideration, and to retard the turnoff time to a time within the following negative half-cycle.

It will be appreciated that the operation of SCR 13 during negative half-cycles of the source voltage is substantially identical to the operation of SCR 12 during positive half-cycles of the source voltage as described above.

Referring to FIG. 2, line *b* illustrates the anode-to-cathode voltage of SCR 12 when the motor 11 is rotating in the forward direction and developing a back e.m.f., opposing the flow of positive current and biasing the cathode of SCR 12 to the above ground potential indicated by the dashed line 31. The anode-to-cathode voltage of SCR 12 is substantially in phase with the source voltage (line *a* of FIG. 2). Due to the positive bias on its cathode caused by the motor back e.m.f., SCR 12 is capable of conducting positive anode-to-cathode current only during that portion of each positive half-cycle of the source voltage when its anode potential is above the positive cathode bias potential (line 31), as indicated by the horizontally lined portions of the waveform at line *b* of FIG. 2. During the beginning and end portions of the positive half-cycle of the source voltage and throughout the entire negative half-cycle, the SCR 12 cannot conduct current because its anode is negative with respect to its cathode. As already stated, within the portion of each positive half-cycle when its anode is sufficiently positive with respect to its cathode, SCR 12 can conduct anode-to-cathode current only after it has received a turn-on signal on its gate electrode from the output of the level detector 20.

As shown at line *c* of FIG. 2, if the motor speed becomes high enough the back e.m.f., designated by the dashed line 32, theoretically can become substantially as great as the maximum positive amplitude of the source voltage. In that case, the anode-to-cathode voltage of SCR 12 never would become sufficiently positive to conduct anode-to-cathode current. That is, the anode voltage on SCR 12 would never go sufficiently positive with respect to the positive bias potential on the cathode (line 32) due to the back e.m.f. of the motor 11.

Line *b* of FIG. 3 illustrates the anode-to-cathode voltage across SCR 13 under the same conditions assumed for line *b* of FIG. 2, that is, for the same forward motor rotational speed. This anode-to-cathode voltage for SCR 13 is 180° out of phase with the source voltage (line *a* of FIG. 3). Because of the polarity of SCR 13, the back e.m.f. of the motor, designated by the dashed line 31, biases the anode of SCR 13 positive with respect to ground. This bias has the effect of extending the possible current-conducting time of SCR 13 to include a portion of the end and the beginning of each positive half-cycle of the source voltage, as well as the entire negative half-cycle of the source voltage, as shown by the horizontally lined portions of the waveform at line *b* of FIG. 3.

As shown at line *c* of FIG. 3, if the motor speed becomes high enough, the positive anode bias due to the back e.m.f, of the motor, designated by the dashed line 32, theoretically can become substantially as great as the maximum amplitude of the source voltage. In that case, the anode-to-cathode voltage of SCR 13 is sufficiently positive for anode-to-cathode current conduction to take place throughout substantially the entire positive half-cycle of the source voltage, as well as throughout the complete negative half-cycle of the source voltage.

In accordance with the preferred embodiment of the present invention the sawtooth generator 14 produces on its first output line 15 a "positive" sawtooth wave capable of controlling the firing of the SCR 12, which conducts positive motor current, at some point within the period from −90° to 270° (or 270° to 630°) of the power supply voltage, depending upon the magnitude and sign of the error signal to the summing network 17. Likewise, the sawtooth generator 14 produces on its second output line 16 a "negative" sawtooth wave capable of controlling the firing of the SCR 13, which conducts negative motor current, at some point within the period from 90° to 450° of the source voltage, depending upon the magnitude and sign of the error signal to the summing network 21. The slopes of these sawtooth waves on lines 15 and 16 are equal and opposite to each other, the "positive" sawtooth wave on line 15 being negative-going, as shown at FIG. 2, line *d*, and the "negative" sawtooth wave on line 16 being positive-going, as shown at FIG. 3, line *d*.

Referring to line *d* of FIG. 2, the level adjust signal at the input of the summing network 17 may be set so that in the absence of an error input signal to the latter, the level detector 20 will produce a turn-on signal for SCR 12 shortly before the 180° point of the source voltage at 10, shown at line *a* of this Figure. The level detector firing level is indicated by the line 33 at line *d*. For purposes of this discussion, the back e.m.f., of the motor is assumed to be zero now. The "positive" sawtooth wave on line 15 has a negative straight line slope from 0° to 270° of the source voltage. At 270° this sawtooth wave is reset to a reference level, and it remains there until 360° of the source voltage. When the negative-going sawtooth wave crosses line 33, the level detector 20 will produce a step output signal. This output signal from the level detector 20 continues until 270°, as indicated by the shaded wave 34 in line *e* of FIG. 2. At 270° the sawtooth wave recrosses the level detector firing line 33 in the positive direction to terminate the step output.

Under the conditions assumed, i.e., zero error signal and zero back e.m.f., SCR 12 will conduct current for a very short time, beginning with the turn-on signal and ending at 180° of the source voltage, as indicated by the vertically crosshatched portion beneath the waveform at line b of FIG. 2. At this time, even though it is still receiving a turn-on signal from the level detector 20, SCR 12 will cease to conduct because its anode-to-cathode voltage will have dropped to zero.

Referring to FIG. 3, line d, under the same assumed conditions (i.e., zero error signal to the summing network 21 and zero back e.m.f.), the positive-going "negative" sawtooth wave will cross the firing level 35 for the level detector 22 to cause the latter to produce a turn-on signal for SCR 13 a few degrees before the 360° point of the source voltage. The waveform of this sawtooth wave is such that it remains at a reference level from 90° to 180°, then increases in magnitude positively along a straight line slope from 180° to 450°, at which time it is reset again to the reference level, remaining there for the next 90°. The firing level 35 for the level detector 22 is equal in magnitude but opposite in sign to the firing level 33 (FIG. 2, line d) for the first level detector 20. This is achieved by adjusting the level adjust input biases for the respective summing networks 17 and 21.

The sawtooth wave input to the level detector 22 on line 16 crosses the level detector firing line 35 a few degrees before the 360° point of the power supply voltage to begin the step output signal from level detector 22, and it recrosses this line in the opposite direction at 450°. Consequently, level detector 22 produces a turn-on signal for SCR 13 from a few degrees before 360° until 450° of the source voltage. This output signal from level detector 22 is designated by the shaded wave 36 in FIG. 3, line e. However, under the conditions assumed, SCR 13 will cease conducting anode-to-cathode current at 360° because at that time its anode-to-cathode voltage crosses the zero axis. The conductive period of SCR 13 is indicated by the vertically crosshatched portion beneath the waveform at line b of FIG. 3.

It will be evident that, with the respective "positive" and "negative" sawtooth waves on lines 15 and 16 having equal and opposite slopes, the integral of the positive current per cycle through SCR 12 and the integral of the negative current per cycle through SCR 13 will be equal, cancelling each other so that the motor 11 will not rotate in either direction. Such non-rotation of the motor reflects the fact that the control or error input signal to both summing networks 17 and 21 is zero. The equal positive and negative currents through the motor during each cycle of the source, under the assumed zero error input signal condition, add desired stiffness to the system when it is used to drive a motor. On the other hand, the level adjust signals may be changed so that for zero error no load current flows, or even so that a certain minimum error is necessary to cause firing of the SCRs, thus forming a "deadband" type of control.

Now, assume that the error signal to the summing networks 17 and 21 has, from 0° to 472°, the "negative" value indicated by the line 37 in FIGS. 2 and 3, line f, because the user changes the input signal on line 18 to increase the motor speed. Also, assume that from 472° on, the error signal has the constant "positive" value indicated by the line 38 in FIGS. 2 and 3, line f, because the user changes the input signal on line 18 to decrease the motor speed. In actual practice the error will not remain constant, but will decrease as the motor speed approaches the desired speed.

The negative error input signal 37, when added to the "positive" sawtooth wave on line 15 in the summing network 17, has the effect of advancing the time in each cycle of the power source when the level detector 20 begins its turn-on signal for SCR 12 because it displaces this sawtooth wave downwardly with respect to the firing level 33 of level detector 20. The new relationship between this downwardly displaced sawtooth wave and the firing level 33 of the level detector is indicated at line g of FIG. 2, which shows that the crossover point now occurs at 45° of the source voltage, because the entire level of the combined input to the level detector 20 has been changed by the addition of the negative error input signal 37 to the sawtooth wave on line 15.

As shown at line h of FIG. 2, the level detector 20 will provide a step output turn-on signal 39 for SCR 12 from 45° to 270°, at which time the sawtooth signal on line 15 is reset abruptly to its reference level, which for the error signal 37 is effective to make the net input to level detector 20 insufficient to enable the level detector 20 to continue producing an output signal.

The SCR 12 will conduct current, beginning at 45° of the source voltage (assuming that its anode is then positive with respect to its cathode) and continuing until its anode-to-cathode voltage has dropped to substantially zero. This latter point is determined by the magnitude of the back e.m.f., of the motor, which produces a positive bias on the cathode of SCR 12 as already explained. For a positive net current to the motor, this turnoff point for SCR 12 will occur at some point before 180° of the power source voltage. From this turnoff point until the point during the next positive half-cycle of the power source voltage at which its anode becomes positive with respect to its cathode, SCR 12 cannot be turned on.

As shown at line g of FIG. 3, the negative error input signal 37, when added to the "negative" sawtooth wave on line 16, has the effect of preventing the level detector 22 from producing a turn-on signal for SCR 13. That is, the downwardly displaced sawtooth input to the level detector 22 never crosses the firing level 35 for the level detector 22.

In the foregoing illustrative example it will be evident that the negative error input signal 37 has caused the motor 11 to conduct positive current for a longer portion of the positive half-cycle of the source voltage and to conduct no negative current during the negative half-cycle. Consequently, the motor will tend to run in the positive current, or forward, direction to decrease the error.

Just the reverse action takes place when the error signal to the summing networks 17 and 21 is positive, as indicated at 38 in FIGS. 2 and 3, line f. For the purpose of illustration, positive error signal 38 is shown as smaller in magnitude than the negative error signal 37. This positive error signal, when added to the "negative" sawtooth wave on line 16, causes a crossover to occur between the upwardly displaced sawtooth input to the level detector 22 and the firing line 35 for the latter which in turn causes the level detector 22 to produce a step output turn-on signal for SCR 13 at a few degrees after 270° of the source voltage. This turn-on signal, indicated at 40 in FIG. 3, line h, continues until the negative sawtooth wave on line 16 is reset, at 90° of the next cycle of the source voltage.

Conversely, the positive error signal, when added to the "positive" sawtooth wave on line 15, retards the time at which the level detector 20 begins to produce a turn-on signal for SCR 12, as shown at 41 in FIG. 2, line h. For a positive error signal of the magnitude indicated, except when the motor speed in reverse is extremely high, the turn-on signal for SCR 12 from level detector 20 will not occur until after the anode-to-cathode voltage across SCR 12 has become negative, so that the latter will not conduct positive current at all. The negative current through the motor will cause a torque tending to rotate it in the reverse direction.

From the foregoing it will be apparent that in the present system, the point at which either SCR 12 or 13 begins to conduct anode-to-cathode current for energizing the motor depends upon both:

(1) the magnitude and polarity of the error input signal to the summing networks 17 and 21, which controls the timing of the beginning of the SCR turn-on signal produced by the respective level detector 20 or 22; and (2) the magnitude and polarity of the source voltage and the back e.m.f., of the motor 11, which controls the beginning and the end of the positive anode-to-cathode voltage period for each SCR.

From lines c and d of FIG. 3, it will be evident that, when, the back e.m.f., produced by motor 11 biases the anode of SCR 13 positive, the motor can be controlled by SCR 13 from 90° to 450° (or 90° of the next cycle) of the source voltage. The turn-on of SCR 13 within this 90° to 450° period depends upon the back e.m.f., and the magnitude of the error input signal. The turnoff of SCR 13 within this 90° to 450° period depends upon the magnitude of the back e.m.f., of the motor. In the preferred embodiment shown, SCR 13 may be turned on during the 90° to 180° period providing its anode-to-cathode voltage is positive due to a high back e.m.f., of the motor, as shown at FIG. 3, line c, not withstanding that the sawtooth wave on line 16 is held at its reset level, provided the error signal is sufficiently large to overcome the level adjust signal and the reset level of the sawtooth wave on line 16.

In the present system the SCR 13, which conducts negative motor current, can control precisely the speed of the motor during the 0° to 90° period if the motor is running in the forward direction. From FIG. 3, line c, it will be apparent that in this 0° to 90° period the total energy input which SCR 13 can provide the motor to slow it down, by passing negative current through the motor, is relatively small so that the motor speed can be regulated very precisely in accordance with the time when SCR 13 is turned on during these 0° to 90° periods.

Conversely, if the motor is running in reverse, the SCR 12, which conducts positive motor current, can regulate the motor speed precisely during the 180° to 270° period. In this 180° to 270° period the total energy content which SCR 12 can provide to the motor to reduce its speed, by passing positive current through the motor, is relatively small and the motor speed can be regulated precisely in accordance with the time when SCR 12 is turned on during this 180° to 270° period.

In both cases, the speed reduction of the motor will be essentially a straight line function of the magnitude of the control or error input signal, representing the difference between the magnitude of the input signal on line 18 and the magnitude of the velocity feedback signal on line 19.

If desired, the sawtooth voltages could be modified so that the "positive" sawtooth wave on line 15 would be reset to a higher positive level and the slope started immediately, as shown in dashed lines in FIG. 2, line d, and the "negative" sawtooth wave on line 16 would be reset to a more negative level and its slope started immediately, as shown in dashed lines in FIG. 3, line d. However, it is desirable that the starting level of the linear slope remain constant for each cycle of the sawtooth waves. This is most reliably provided by holding the reset value for some short time to allow transients to die out.

When the sawtooth wave on line 15 is at its reset value, a large error is required to cause level detector 20 to deliver a turn-on signal to SCR 12. As the linear ramp of the sawtooth wave becomes more negative a smaller error will cause level detector 20 to deliver a turn-on signal to SCR 12. Therefore, the reset point of this sawtooth, which may be selected to occur at any point during the cycle of the AC source, is selected to occur at the point where the anode-to-cathode voltage of SCR 12 is most likely to be zero or negative. This arrangement prevents a small error signal from causing the turn-on signal to trail over into the next half-cycle of the source voltage and cause premature firing of SCR 12, while at the same time, providing substantially full 360° control over SCR 12. The same is true, of course, with respect to the sawtooth wave on line 16 and the control of SCR 13.

While a presently preferred embodiment of this control system has been described in detail with reference to the accompanying drawings, it is to be understood that various modifications, omissions and adaptations which depart from the disclosed embodiment may be adapted without departing from the spirit and scope of this invention. For example, the control system of the present invention, although described and illustrated with a single-phase AC power source, is equally applicable to a system using a polyphase AC power source to drive the load. It will also be apparent to persons skilled in the art that the SCRs 12 and 13 might be replaced by controlled rectifiers of the ionizable gas type, such as Thyratrons.

Having described my invention, I claim:

1. In a system for supplying current to a load of a polarity and magnitude dependent on the sense of an error signal, an AC source, first and second controlled rectifiers, a load connected in series with said rectifiers and said source with said rectifiers being connected to conduct on with opposite polarities thereacross, the voltage across said rectifiers varying with the voltage of said source and being subject to conditions in said system which causes the anode to cathode voltage of one rectifier to be positive for more than a half-cycle and the other to be negative for less than a half-cycle of said source, means connected to said AC source for providing therefrom respective cyclically varying control signals in synchronism with said AC source for effecting conduction of a corresponding rectifier in accordance with the magnitude of the respective control signal and capable of rendering the rectifier conductive in its normally nonconductive half-cycle of said power source when the voltage across the corresponding rectifier is proper for conduction, means for providing an error signal and means for combining said error signal with said cyclically varying signals to increase one of said cyclically varying signals and decrease the other in accordance with the magnitude of the error signal with the one of the cyclically varying signals which is increased depending on the sense of the error signal.

2. A control system as set forth in claim 1 wherein said load is a DC motor.

3. A control system according to claim 2, and further comprising means for producing a motor velocity signal proportional to the motor speed, means for providing a variable input signal for establishing the selected desired motor speed, and means for combining said motor velocity signal and said input signal to provide said error signal.

4. A control system according to claim 1, wherein the cyclically changing signal for controlling the turn-on of the respective controlled rectifier is a respective sawtooth wave having a substantially straight line slope for more than 180° of the power supply cycle.

5. A control system according to claim 3, wherein the cyclically changing signal for controlling the turn-on of the respective controlled rectifier is a respective sawtooth wave having a substantially straight line slope for substantially 270° of the power supply cycle, said sawtooth waves having opposite respective slopes and being phase-displaced from each other by substantially 180° of the power supply cycle.

6. A control system according to claim 5, wherein each sawtooth wave is reset at the completion of its slope to a value ineffective, when combined with the error signal, to turn on the respective controlled rectifier.

7. A control system according to claim 6, wherein said controlled rectifiers are connected to said motor to be oppositely biased by the back e.m.f., of the motor to determine the time during each power supply cycle when the anode of the respective controlled rectifier is positive with respect to its cathode.

8. A control system for a load comprising:
an AC power source, sawtooth generator means connected to said AC source for generating phase-displaced, oppositely sloped first and second sawtooth waves in synchronism with said AC source, each of which has a substantially straight line slope for substantially more than half of its complete cycle and then is reset for the remainder of its cycle;
means for providing an input signal for controlling the energization of the load;
means for producing a feedback signal whose magnitude is proportional to a load variable;
means for combining said input signal and said feedback signal to produce an error signal which is proportional to the difference between the desired magnitude of the load variable and the actual magnitude of the load variable and for combining said error signal and each of said sawtooth waves;

oppositely connected first and second controlled rectifiers connected to the load to control its energization by positive load current through the anode-cathode path of the first controlled rectifier and by negative load current through the anode-cathode path of the second controlled rectifier;

means connected to the control electrode of the first controlled rectifier for turning the latter on to pass positive load current when the combination of said error signal and said first sawtooth wave passes a predetermined value and the anode of the first controlled rectifier is positive with respect to its cathode;

and means connected to the control electrode of the second controlled rectifier for turning the latter on to pass negative load current when the combination of said error signal and said second sawtooth wave passes a predetermined value and the anode of the second controlled rectifier is positive with respect to its cathode.

9. A control system as set forth in claim 8 wherein said load is a DC motor.

10. A control system according to claim 9, and further comprising AC power supply means connected to the motor and connected to said sawtooth generator means to determine the cycle of each of said sawtooth waves.

11. A control system according to claim 10, wherein said sawtooth waves are phase-displaced from each other by substantially 180°, and each of said sawtooth waves has a straight line slope for at least 270° of a cycle of the power supply so as to enable the respective controlled rectifier to reverse-energize the motor during a portion of the power supply cycle when only a relatively small quantity of reverse-energizing current energy is available.

12. A control system according to claim 11, wherein each sawtooth wave has a straight line slope for substantially 270° of a cycle of the power supply and at the end of its straight line slope is reset abruptly to a predetermined level at which it is ineffective, when combined with the error signal, to turn on the respective controlled rectifier.

13. A control system according to claim 12, wherein said controlled rectifiers are connected to the motor to be oppositely biased by the back e.m.f., of the motor to determine the period during each power supply cycle when the anode of the respective controlled rectifier is positive with respect to its cathode.

14. A system for supplying current to an electrical load to control the load variable, said system comprising a load rectifier for conducting current of one polarity to said load, an AC power source connected across said load rectifier and said load whereby said rectifier is conditioned to conduct current of said one polarity to said load in one half-cycle and is nonconductive on the other half-cycle of the AC voltage thereacross, and means for controlling the turn on of said controlled rectifier within a half-cycle of said power source in accordance with a first cyclically varying signal and an error signal which is proportional to the difference between the actual value and the desired value of said load variable, means for providing the said error signal, means connected to said AC power source for providing therefrom the said cyclically varying signal in synchronism with said AC power source, the AC power across said rectifier being subject to conditions in said system rendering the anode-cathode of said rectifier of proper polarity for conduction during the normally nonconductive half-cycle and said first cyclically changing signal being a sawtooth wave signal having a substantially straight line slope which increases from a low value toward a maximum value during a half-cycle of said source during which the rectifier is capable of conduction and reaches a maximum value in the subsequent half-cycle of the AC power source.

15. A system according to claim 14 wherein said sawtooth wave has a substantially constant reference level for a portion of the half-cycle immediately prior to the half-cycle in which the rectifier may be rendered conductive.

16. A system as defined in claim 15 wherein said load is a DC motor.

17. A system as defined in claim 16 wherein said sawtooth wave rises from a minimum at the beginning of the half-cycle of said source in which said rectifier is biased for conduction to a maximum approximately after 270° of the AC cycle.

18. A system as defined in claim 15 wherein said sawtooth wave rises from a minimum at the beginning of the half-cycle of said source in which said rectifier is biased for conduction to a maximum approximately after 270° of the AC cycle.

19. A control system for controlling a load energized from an AC power supply comprising:

sawtooth generator means connected to said AC source for generating oppositely sloped first and second sawtooth waves which are phase-displaced by substantially 180° in synchronism with said AC source, each of said sawtooth waves having a substantially straight line slope for substantially 270° of a cycle of the power supply and being abruptly reset to a predetermined level for the remainder of the cycle;

first and second summing networks;

first and second level detectors connected respectively to the outputs of said summing networks;

first and second controlled rectifiers having their respective gate electrodes connected to the respective outputs of said first and second level detectors, said controlled rectifiers having their respective anode-cathode paths oppositely connected in series with the load across the power supply;

means for applying to the respective inputs of said summing networks a load signal having a magnitude and a polarity proportional to a load variable;

means for applying to the respective outputs of said summing networks a variable input signal which is combined with said load variable signal to produce an error signal proportional to the difference between the magnitude of the actual load variable and desired magnitude of the load variable which corresponds to said input signal;

and means for applying said first and second sawtooth waves respectively to the inputs of said first and second summing networks to combine with the error signal therein to produce respective output signals from said summing networks;

each of said level detectors being operative to apply a turn-on signal to the gate electrode of the respective controlled rectifier when the output signal from the respective summing network passes a predetermined level;

the output signal from either summing network being ineffective to cause the respective level detector to produce a turn-on signal while the respective sawtooth wave input to said summing network is at said predetermined reset level.

20. A control system as set forth in claim 19 wherein said load is a DC motor and the polarity of said load signal has a polarity corresponding to the direction of said motor.

21. A control system according to claim 20, wherein said first and second sawtooth waves having substantially equal and opposite slopes.

22. A control system according to claim 21, wherein said level detectors having substantially equal levels at which the respective turn-on signals are produced.

23. A system for supplying current to an electrical load to control a load variable, said system comprising an AC source, oppositely connected first and second controlled rectifiers connected to said AC source and to said load to control its energization by current of one polarity through said first controlled rectifier on one half-cycle of said AC source and by current of the opposite polarity through said controlled rectifier on the other half-cycle of said AC source, the AC voltage across said rectifiers being subject to electrical conditions in said systems which renders one said rectifier of proper polarity for conduction during the respective half-cycle in which the source has a polarity which would render the rectifier nonconductive and to the other rectifier nonconductive for at least a portion of the respective half-cycle of the source of a polarity to render the other rectifier conductive, sawtooth generator means connected to said AC source for generating therefrom phase-displaced first and second sawtooth waves in synchronism with said AC source each of which has a substantially straight line slope for substantially more than half of its complete cycle and a reference level for the remainder of its complete cycle, said first and second sawtooth waves each rising from a low level at the beginning of the half-cycle of the source in which the polarity of the source is such that the respective rectifier is normally biased for conduction and for a substantial portion of the following half-cycle, means for providing an error signal indicating the deviation of said load variable from its desired value, means for combining said error signal with each of said sawtooth waves, means connected to the control electrode of the first controlled rectifier for turning the latter on to conduct current of one polarity to said load when the combination of said error signal and said first sawtooth wave passes a predetermined value and the anode of said first controlled rectifier is positive with respect to its cathode, and means connected to the control electrode of said second controlled rectifier for turning the latter on to pass current of the opposite polarity to said load when the combination of said error signal and said second sawtooth wave passes a predetermined value and the anode of said second controlled rectifier is positive with respect to its cathode.

24. A system according to claim 23 wherein the period of each sawtooth wave is equal to the period of the AC source signal.

25. A system according to claim 23 wherein said sawtooth waves are phase-displaced from each other by substantially 180° and each of said sawtooth waves has a straight line slope for at least 270° of each cycle so as to enable the respective controlled rectifier to reverse-energize the load when only a relatively small quantity of reverse-energizing current is available.

26. A control system for controlling the magnitude of a load variable of a load which is energized from an AC power source comprising:

oppositely connected first and second controlled rectifiers connected anode-to-cathode and cathode-to-anode, the parallel combination being connected in series with said load and with said AC source;

sawtooth generator means connected to said AC source for generating oppositely sloped first and second sawtooth waves phase-displaced by 180° and in synchronism with said AC source, each of said sawtooth waves having a period equal to the period of the AC source and during each cycle having a straight line slope for 270° and being abruptly reset to a reference level for the remainder of the cycle;

means for providing an input signal proportional to the desired magnitude of the load variable of said load;

means for providing a feedback signal proportional to the actual magnitude of the load variable of said load;

a first summing network for combining said input signal, said feedback signal and said first sawtooth wave;

a second summing network for combining said input signal, said feedback signal and said second sawtooth wave;

a first level detector connected to said first summing network and to the gate electrode of said first controlled rectifier and adapted to provide a turn-on signal to said first controlled rectifier when the output of said first summing network passes a predetermined level;

and a second level detector connected to said second summing network and to the gate electrode of said second controlled rectifier and adapted to provide a turn-on signal to said first controlled rectifier when the output of said second summing network passes a predetermined level.

27. A control system as set forth in claim 26 wherein said load is a DC motor.